United States Patent
Jung et al.

(10) Patent No.: US 7,998,650 B2
(45) Date of Patent: Aug. 16, 2011

(54) METHOD FOR PREPARING OXYTITANIUM PHTHALOCYANINE CHARGE GENERATING MATERIAL AND THE NEW-TYPE OXYTITANIUM PHTHALOCYANINE CHARGE GENERATING MATERIAL THEREFROM

(75) Inventors: Ki Suck Jung, Busan (KR); Jong Ho Kwon, Busan (KR); Seong Soo Park, Busan (KR); Jun Sik Shin, Busan (KR); Woo Ho Son, Busan (KR); Seung Wook Song, Busan (KR)

(73) Assignee: PHTALOS Co., Ltd., Busan (KR)

( * ) Notice: Subject to any disclaimer, the term of this patent is extended or adjusted under 35 U.S.C. 154(b) by 1256 days.

(21) Appl. No.: 10/574,853

(22) PCT Filed: Oct. 7, 2004

(86) PCT No.: PCT/KR2004/002564
§ 371 (c)(1),
(2), (4) Date: Nov. 28, 2006

(87) PCT Pub. No.: WO2005/033804
PCT Pub. Date: Apr. 14, 2005

(65) Prior Publication Data
US 2007/0111132 A1    May 17, 2007

(30) Foreign Application Priority Data
Oct. 8, 2003 (KR) .................. 10-2003-0070059

(51) Int. Cl.
*G03G 5/06* (2006.01)
(52) U.S. Cl. .............. 430/135; 430/78; 540/141
(58) Field of Classification Search ............ 430/78, 430/135; 540/141
See application file for complete search history.

(56) References Cited

U.S. PATENT DOCUMENTS

| | | | |
|---|---|---|---|
| 4,971,877 A | 11/1990 | Miyamoto et al. | |
| 5,164,493 A | 11/1992 | Mayo et al. | |
| 5,252,417 A | 10/1993 | Tokida et al. | |
| 5,298,617 A | 3/1994 | Nukada et al. | |
| 5,786,121 A | 7/1998 | Richter et al. | |

(Continued)

FOREIGN PATENT DOCUMENTS
JP    62-256865    11/1987
(Continued)

OTHER PUBLICATIONS

Yao, Jiachang et al., "A Convenient Synthetic Method for Pure Oxo (phthalocyaninato) titanium (IV) and Application to Other Metal Phthalocyanines", Bull. Chem. Soc. Jpn., vol. 68, No. 3, pp. 1001-1005, 1995.

*Primary Examiner* — Christopher RoDee
*Assistant Examiner* — Rachel L Zhang
(74) *Attorney, Agent, or Firm* — Oblon, Spivak, McClelland, Maier & Neustadt, L.L.P.

(57) ABSTRACT

Disclosed herein is a method for preparing oxytitanium phthalocyanine as a charge generating material. The method comprises the steps of mixing 30~100 wt % sulfuric acid and an oxytitanium phthalocyanine crude in a mixing ratio between 100:1 and 1:1, homogeneously grinding the mixture in a wet grinder filled with zirconia or glass beads as grinding media at −20° C.~60° C. for 0.1~24 hours, and removing the grinding media from the ground mixture using a solvent. According to the method, oxytitanium phthalocyanine usable as a high-quality charge generating material can be prepared without the use of expensive and difficult-to-handle reactants, such as trifluoroacetic acid and pentafluoropropionic acid. Further disclosed is an oxytitanium phthalocyanine charge generating material prepared by the method.

14 Claims, 5 Drawing Sheets

U.S. PATENT DOCUMENTS 6,485,658 B1    11/2002    Horiuchi et al.

FOREIGN PATENT DOCUMENTS

| | | |
|---|---|---|
| KR | 9407962 | 8/1994 |
| KR | 2003-0022179 | 3/2003 |
| KR | 2003-0022831 | 3/2003 |
| KR | 2003-0058987 | 7/2003 |
| KR | 2003-0058988 | 7/2003 |
| KR | 2003-0086508 | 11/2003 |
| KR | 2003-0086509 | 11/2003 |

METHOD FOR PREPARING OXYTITANIUM PHTHALOCYANINE CHARGE GENERATING MATERIAL AND THE NEW-TYPE OXYTITANIUM PHTHALOCYANINE CHARGE GENERATING MATERIAL THEREFROM

TECHNICAL FIELD

The present invention relates to a method for preparing oxytitanium phthalocyanine suitable as a charge generating material. More particularly, the present invention relates to a method for preparing oxytitanium phthalocyanine as a charge generating material by appropriately mixing sulfuric acid with an oxytitanium phthalocyanine crude in a wet grinder, and an oxytitanium phthalocyanine charge generating material having a novel crystal form prepared by the method.

BACKGROUND ART

Photoconductors are highly photosensitive in the visible region, and are widely used in various devices, such as copying machines, printers, etc. Most of the currently used photoconductors are produced by applying a photosensitive layer including an inorganic charge generating material selected from selenium, zinc oxide, cadmium sulfide and others as a main component to a conductive substrate. However, these inorganic charge generating materials are still unsatisfactory in photosensitivity, thermal stability, water resistance, durability and other physical properties required in copying machines and printers. For example, photoconductors using cadmium sulfide suffer from poor water resistance and durability, and photoconductors using zinc oxide have a problem in terms of low durability. Further, photoconductors using selenium and cadmium sulfide are limited in their production and handling.

In an effort to solve the problems of the inorganic charge generating materials, a great deal of research has been conducted on organic charge generating materials. Of these, oxytitanium phthalocyanine is widely used due to its superior photosensitivity, durability, thermal stability, etc.

Oxytitanium phthalocyanine is commonly synthesized by reacting 1,2-dicyanobenzene or 1,3-diiminoisoindoline as a main material with titanium tetrachloride or tetraalkoxy titanium as a titanium source in N-methylpyrrolidone, 1-chloronaphthalene or quinoline as a solvent at 160~200° C. for 6~12 hours, and purifying the obtained reaction product. The final product is strictly defined as "oxytitanium phthalocyanine in a crude state (hereinafter, referred to as an "oxytitanium phthalocyanine crude")". Japanese Patent No. 62-256865 describes a method for preparing an oxytitanium phthalocyanine crude by using 1,2-dicyanobenzene and titanium tetrachloride, U.S. Pat. No. 4,971,877 describes a method for preparing an oxytitanium phthalocyanine crude by using 1,3-diiminoisoindoline and tetraalkoxy titanium, and Bull. Chem. Soc. Jpn., 68, 1001-1005, 1995 reports a method for preparing an oxytitanium phthalocyanine crude by using 1,2-dicyanobenzene and tetrabutoxy titanium. Since the oxytitanium phthalocyanine crudes cannot be directly used as charge generating materials due to their large particle size and poor electrophotographic characteristics, they must undergo an appropriate post treatment process in order to be used as highly photosensitive charge generating materials. The structural formula of oxytitanium phthalocyanine is represented by the following Formula 1:

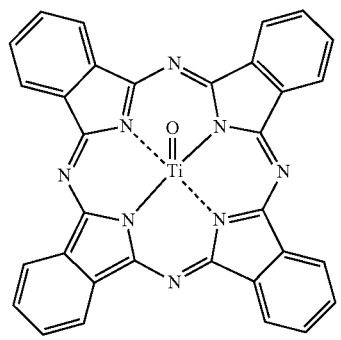

Formula 1

U.S. Pat. No. 5,164,493 discloses a process for the preparation of oxytitanium phthalocyanine as a charge generating material which comprises dissolving an oxytitanium phthalocyanine crude in a mixed solution of trifluoroacetic acid and methylene chloride, and reprecipitating the solution in a mixed solution of methanol and water. The charge generating material thus prepared shows X-ray diffraction peaks at Bragg angles of 7.2±0.2°, 8.9±0.2°, 14.3±0.2°, 18.0±0.2°, 23.9±0.2°, 25.6±0.2°, 27.3±0.2°, 28.8±0.2°, 29.4±0.2°, and 36.4±0.2°. However, this process has the following disadvantages: i) large quantities of toxic gases are released due to the use of trifluoroacetic acid, ii) troublesome steps are involved, and iii) the high cost of trifluoroacetic acid results in high production costs.

U.S. Pat. No. 5,252,417 discloses a process for preparing oxytitanium phthalocyanine as a charge generating material by using concentrated sulfuric acid, which is cheaper than trifluoroacetic acid. The charge generating material thus prepared shows X-ray diffraction peaks at Bragg angles of 7.2±0.2°, 9.1±0.2°, 11.2±0.2°, 13.5±0.2°, 14.4±0.2°, 24.0±0.2°, 27.2±0.2°, and 28.8±0.2°. According to this method, an oxytitanium phthalocyanine crude is dissolved in concentrated sulfuric acid in an amount of about 30~50 times the amount of the oxytitanium phthalocyanine crude, and the resulting solution is recrystallized from a solution of methanol and water. However, since an excessive amount of the sulfuric acid is used, costs required for neutralization are increased. In addition, since the crude must be dissolved at a temperature not higher than room temperature, there is a limitation in reducing the amount of the sulfuric acid to be used due to increased viscosity.

U.S. Pat. No. 5,786,121 suggests a method for preparing oxytitanium phthalocyanine suitable as a charge generating material by mixing pentafluoropropionic acid and a halogenated alkane or halogenated aromatic compound, adding an aliphatic or aromatic sulfonic acid as an additive to the mixture to obtain an oxytitanium phthalocyanine crude, dissolving the oxytitanium phthalocyanine crude, and reprecipitating the solution in a mixed solution of water and methanol. However, since this method uses pentafluoropropionic acid, it produces much more toxic fumes than the method using trifluoroacetic acid. In addition, since the method uses difficult-to-handle and expensive raw materials, it is very dangerous and incurs considerable production costs.

Thus, there is a need for a method of preparing oxytitanium phthalocyanine usable as a high-quality charge generating material by using a cheap and easy-to-handle material, without the use of expensive and difficult-to-handle reactants, such as trifluoroacetic acid and pentafluoropropionic acid.

DISCLOSURE OF THE INVENTION

Therefore, the present invention has been made in view of the above problems, and it is an object of the present invention to provide a method for preparing oxytitanium phthalocyanine as a high-quality charge generating material by using a cheap and easy-to-handle material.

It is another object of the present invention to provide an oxytitanium phthalocyanine charge generating material prepared by the method.

It is still another object of the present invention to provide a photoconductor produced using the oxytitanium phthalocyanine charge generating material.

In accordance with one aspect of the present invention, there is provided a method for preparing oxytitanium phthalocyanine as a charge generating material, comprising the steps of mixing 30~100 wt % sulfuric acid and an oxytitanium phthalocyanine crude in a mixing ratio between 100:1 and 1:1, homogeneously grinding the mixture in a wet grinder filled with zirconia or glass beads as grinding media at −20° C.~60° C. for 0.1~24 hours, and removing the grinding media from the ground mixture using a solvent.

In accordance with another aspect of the present invention, there is provided an oxytitanium phthalocyanine charge generating material prepared by the method.

In accordance with still another aspect of the present invention, there is provided a photoconductor produced using the oxytitanium phthalocyanine charge generating material.

BRIEF DESCRIPTION THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Hereinafter, the present invention will be explained in more detail.

The present invention provides a method for preparing oxytitanium phthalocyanine as a charge generating material by mixing sulfuric acid and an oxytitanium phthalocyanine crude, grinding the mixture in a wet grinder filled with zirconia or glass beads as grinding media, and removing the grinding media from the ground mixture using a solvent.

Figure 1:
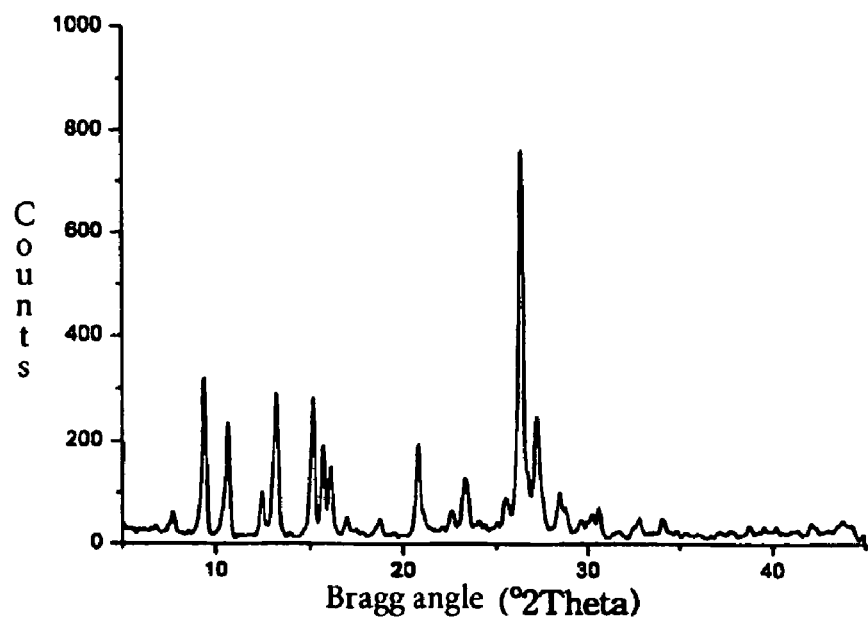
FIG. 1 is a graph showing the X-ray diffraction pattern of an oxytitanium phthalocyanine crude.

The oxytitanium phthalocyanine crude used herein may be obtained by various processes commonly known in the art. For example, the oxytitanium phthalocyanine may be obtained by reacting 1,2-dicyanobenzene or 1,3-diiminoisoindoline as a main material with titanium tetrachloride or tetraalkoxy titanium as a titanium source in N-methylpyrrolidone, 1-chloronaphthalene or quinoline as a solvent at 160~200° C. for 6~12 hours, and purifying the obtained reaction product. FIG. 1 shows the X-ray diffraction pattern of the oxytitanium phthalocyanine crude used in the present invention.

The sulfuric acid and the oxytitanium phthalocyanine crude are mixed in a mixing ratio between 100:1 and 1:1. The sulfuric acid preferably has a concentration of 30~100 wt %. If the concentration of the sulfuric acid is below 30 wt % or the mixing ratio of the sulfuric acid and the oxytitanium phthalocyanine crude exceeds 1:1, the oxytitanium phthalocyanine crude is not substantially dissolved in the sulfuric acid and agglomerated. Preferably, the sulfuric acid has a concentration of 50~80 wt % and the mixing ratio of the sulfuric acid and oxytitanium phthalocyanine crude is in the range between 50:1 and 10:1.

As the grinder, there can be used: an agitation-type wet grinder, e.g., attritor, sand mill or pearl mill; a diffuser; a ball mill; or vibration mill.

As the grinding media, zirconia or glass beads can be used. The grinding temperature is in the range of −20° C.~60° C. When the grinding temperature is lower than −20° C. or higher than 60° C., the oxytitanium phthalocyanine crude is not substantially dissolved in the sulfuric acid and further agglomerated or decomposed. The grinding is preferably carried out at a temperature of 0° C.~25° C. The grinding time is 0.1~24 hours. Within this range, the sulfuric acid and the oxytitanium phthalocyanine crude are homogeneously ground. It is preferable to grind the mixture for 3~5 hours.

After completion of the grinding, the solvent is used to remove the grinding media from the ground mixture. For example, the solvent is added to the ground mixture in a ratio of 1:4 to dissolve the ground mixture, thereby forming a slurry. Thereafter, the slurry is filtered, washed, and dried at 40~80° C. for 3~20 hours. At this time, the washing is preferably carried out until the filtrate is neutralized (a pH of at least 7.0).

Examples of preferred solvents include water, aliphatic alcohols, e.g., methanol and ethanol, ketones, e.g., acetone, methyl ethyl ketone and tetrahydrofuran, and mixtures thereof.

The oxytitanium phthalocyanine charge generating material prepared by the method of the present invention shows broad X-ray diffraction peaks at Bragg angles of 6.8±0.2° to 10.0±0.2°, and particularly the highest peak appears at a Bragg angle of 8.8±0.2°.

In addition to these peaks, the oxytitanium phthalocyanine charge generating material shows X-ray diffraction characteristic peaks at Bragg angles of 14.2±0.2°, 24.0±0.2° and 27.2±0.2°, or at Bragg angles of 7.2±0.2°, 9.2±0.2°, 10.0±0.2°, 11.3±0.2°, 13.7±0.2°, 17.8±0.2°, 18.5±0.2°, 23.0±0.2°, 24.8±0.2°, 27.2±0.2° and 28.8±0.2°, or at Bragg angles of 7.5±0.2°, 11.4±0.2°, 13.7±0.2°, 14.8±0.2°, 18.0±0.2°, 18.8±0.2°, 23.0±0.2°, 25.1±0.2°, 27.2±0.2° and 28.8±0.2°. The oxytitanium phthalocyanine charge generating material shows the strongest X-ray diffraction peak at a Bragg angle of 27.2±0.2°. The oxytitanium phthalocyanine charge generating material can be effectively used in the production of photoconductors, particularly organic photoconductors.

Figure 10:
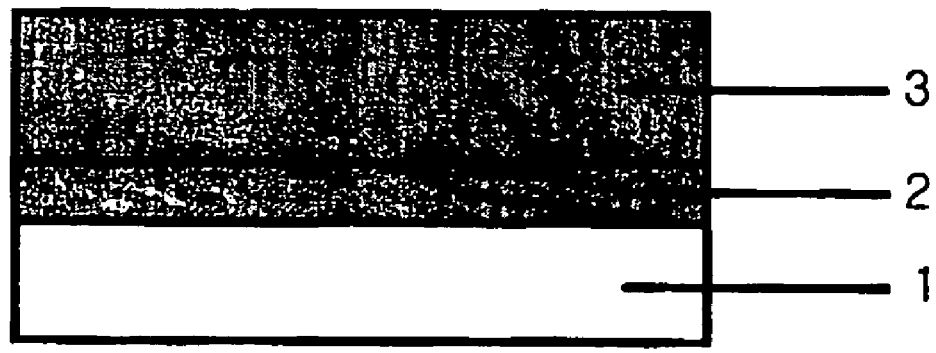
FIG. 10 is a cross-sectional view of a photoconductor drum used for the measurement of the electrical properties of oxytitanium phthalocyanine in the present invention.

FIG. 10 shows a cross-section of a photoconductor drum according to an embodiment of the invention. Reference numeral 1 is the surface of a drum. Reference numeral 2 identifies an oxide film. Reference numeral 3 is a charge generating layer comprising oxytitanium phthalocyanine.

The present invention will now be described in more detail with reference to the following examples and comparative examples. However, these examples are not to be construed as limiting the scope of the invention.

EXAMPLE 1

720 ml of zirconia beads were introduced into a 0.5 gallon attritor (Union Process, USA), and then 300 ml of 70 wt % sulfuric acid and 50 g of an oxytitanium phthalocyanine crude were added thereto. Thereafter, the mixture was ground for 5 hours while the temperature of the grinder was maintained at room temperature or less. After completion of the grinding, 2,000 ml of water was added to dilute the ground mixture, and then the zirconia beads were separated from the ground mixture. The remaining slurry was filtered, washed with water until the filtrate was neutralized, and dried in a drier at 60° C. to yield 48.8 g of an oxytitanium phthalocyanine charge generating material. The X-ray diffraction pattern of the oxytitanium phthalocyanine was obtained under the following conditions:

X-ray bulb: Cu
Cu K-alpha wavelength (Å): 1.54056
Voltage (kV): 40.0
Current (mA): 100.0
Starting angle (° 2 Theta): 5.00
Stopping angle (° 2 Theta): 45.00
Stepping angle (° 2 Theta): 0.020

Figure 2:
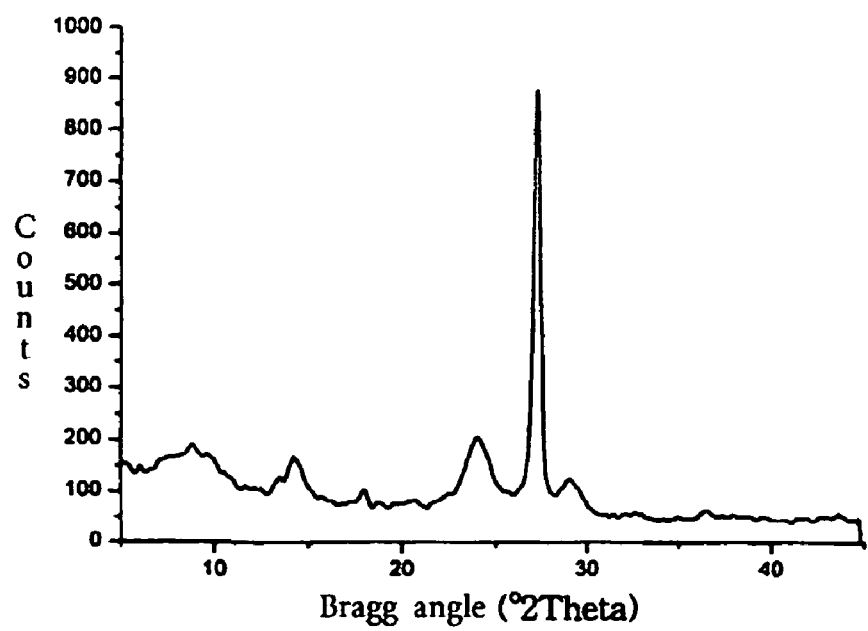
FIG. 2 is a graph showing the X-ray diffraction pattern of oxytitanium phthalocyanine prepared in Example 1 of the present invention.

The X-ray diffraction pattern of the oxytitanium phthalocyanine charge generating material is shown in FIG. 2.

EXAMPLE 2

Figure 3:
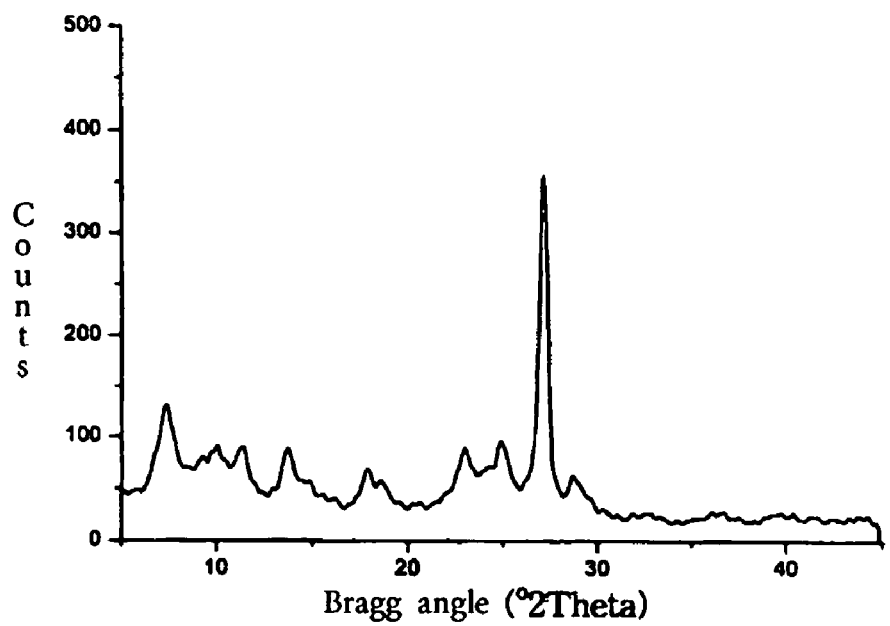
FIG. 3 is a graph showing the X-ray diffraction pattern of oxytitanium phthalocyanine prepared in Example 2 of the present invention.

48.4 g of an oxytitanium phthalocyanine charge generating material was prepared in the same manner as in Example 1, except that a mixture (1:1) of water and methanol as a solvent for separating the zirconia beads was used. The X-ray diffraction pattern of the oxytitanium phthalocyanine charge generating material is shown in FIG. 3.

EXAMPLE 3

Figure 4:
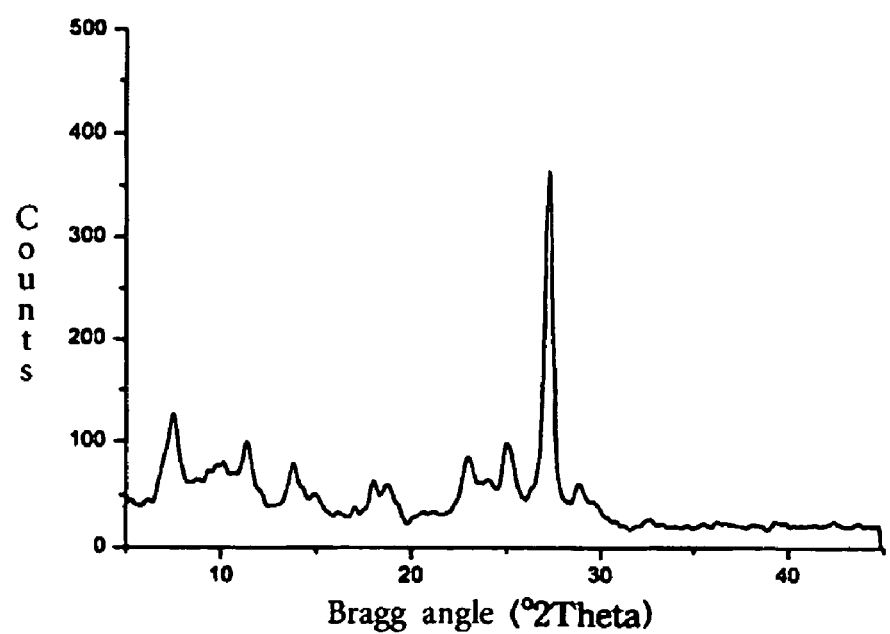
FIG. 4 is a graph showing the X-ray diffraction pattern of oxytitanium phthalocyanine prepared in Example 3 of the present invention.

48.4 g of an oxytitanium phthalocyanine charge generating material was prepared in the same manner as in Example 1, except that a mixture (7:3) of water and methanol as a solvent for separating the zirconia beads was used. The X-ray diffraction pattern of the oxytitanium phthalocyanine charge generating material is shown in FIG. 4.

COMPARATIVE EXAMPLE 1

Figure 5:
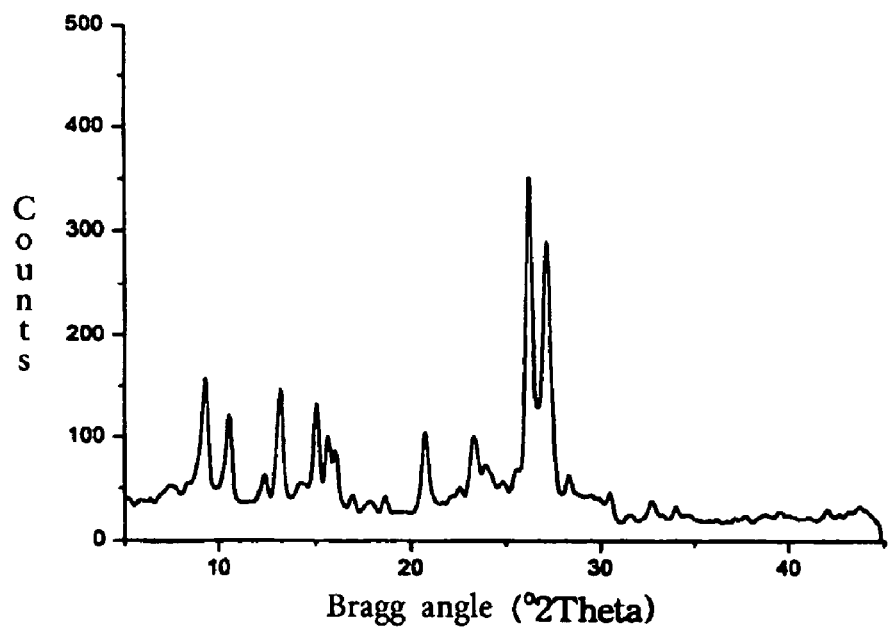
FIG. 5 is a graph showing the X-ray diffraction pattern of oxytitanium phthalocyanine prepared in Comparative Example 1 of the present invention.

300 ml of 70 wt % sulfuric acid was placed in a beaker, and stirred using a magnetic stirrer while the temperature was maintained at 10° C. or less. 50 g of an oxytitanium phthalocyanine crude was added to the beaker while maintaining the temperature, and the mixture was then stirred for 5 hours. Thereafter, 2,000 ml of water was added to dilute the mixture, filtered, washed with water until the filtrate was neutralized (a pH of at least 7.0), and dried in a drier at 60° C. to yield 48.7 g of oxytitanium phthalocyanine. The X-ray diffraction pattern of the oxytitanium phthalocyanine is shown in FIG. 5.

COMPARATIVE EXAMPLE 2

Figure 6:
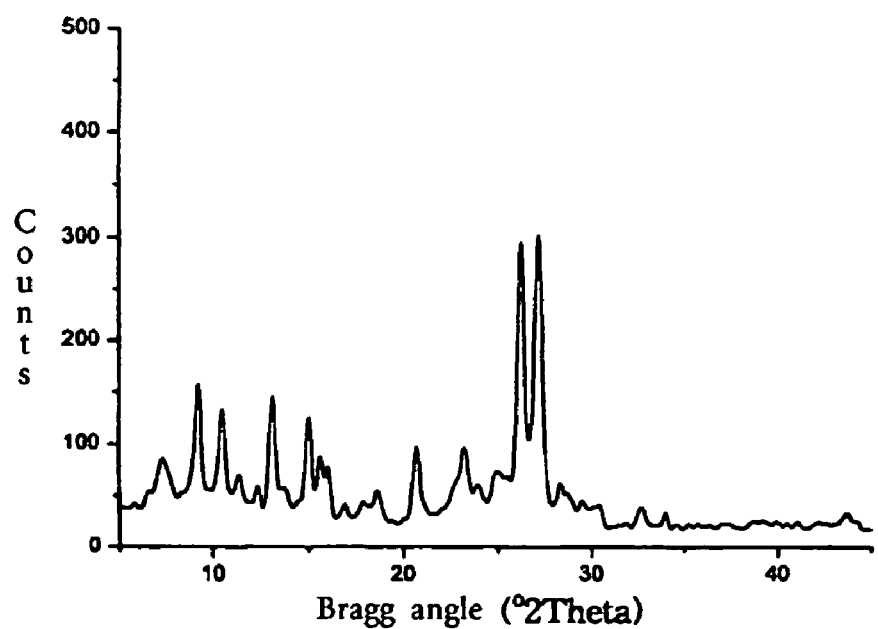
FIG. 6 is a graph showing the X-ray diffraction pattern of oxytitanium phthalocyanine prepared in Comparative Example 2 of the present invention.
Figure 7:
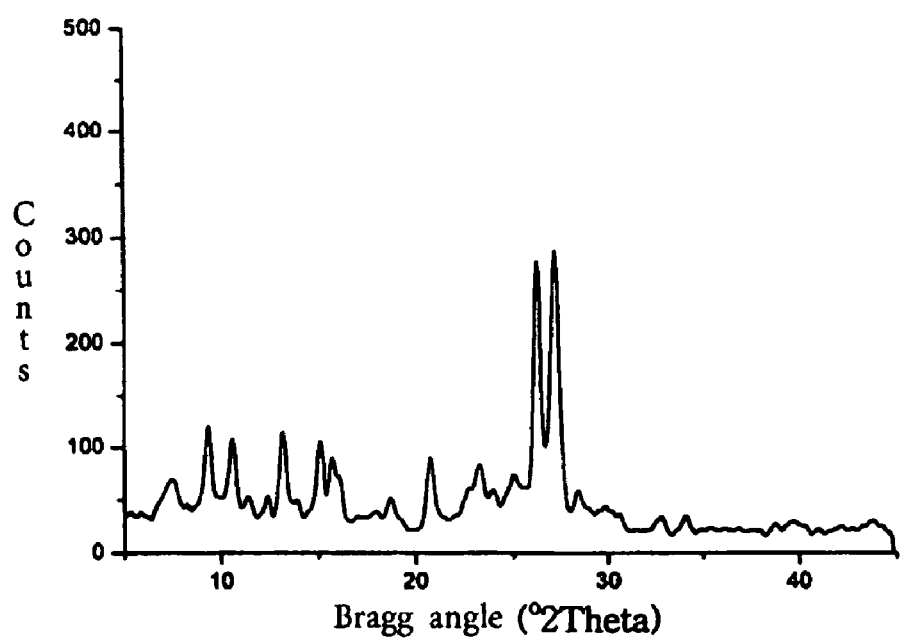
FIG. 7 is a graph showing the X-ray diffraction pattern of oxytitanium phthalocyanine prepared in Comparative Example 3 of the present invention.

48.6 g of oxytitanium phthalocyanine was prepared in the same manner as in Comparative Example 1, except that a mixture (1:1) of water and methanol was used instead of water. The X-ray diffraction pattern of the oxytitanium phthalocyanine is shown in FIG. 6.

COMPARATIVE EXAMPLE 3

48.6 g of oxytitanium phthalocyanine was prepared in the same manner as in Comparative Example 1, except that a mixture (7:3) of water and methanol was used instead of water. The X-ray diffraction pattern of the oxytitanium phthalocyanine is shown in FIG. 6.

COMPARATIVE EXAMPLE 4

Figure 8:
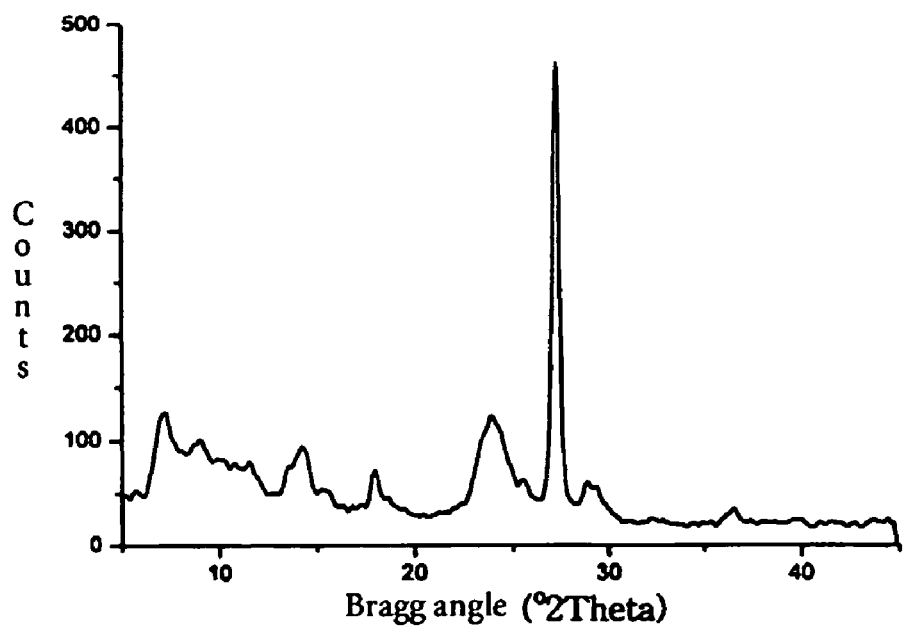
FIG. 8 is a graph showing the X-ray diffraction pattern of oxytitanium phthalocyanine prepared in Comparative Example 4 of the present invention.

10 g of an oxytitanium phthalocyanine crude was dissolved in a mixed solution of 20 ml of trifluoroacetic acid and 80 ml of dichloromethane, and stirred for 15 min. After stirring, 500 ml of methanol and 500 ml of water were added to the mixture, stirred for 45 minutes, and left to stand for 25 minutes. Thereafter, the supernatant was removed, followed by the addition of methanol (400 ml). The resulting slurry was stirred for one hour, filtered, and washed with methanol (20 ml×2), water (20 ml×2), water (100 ml×1) and methanol (40 ml). The washed slurry was dried in a drier at 60° C. to yield 9.6 g of oxytitanium phthalocyanine. The X-ray diffraction pattern of the oxytitanium phthalocyanine is shown in FIG. 8.

COMPARATIVE EXAMPLE 5

Figure 9:
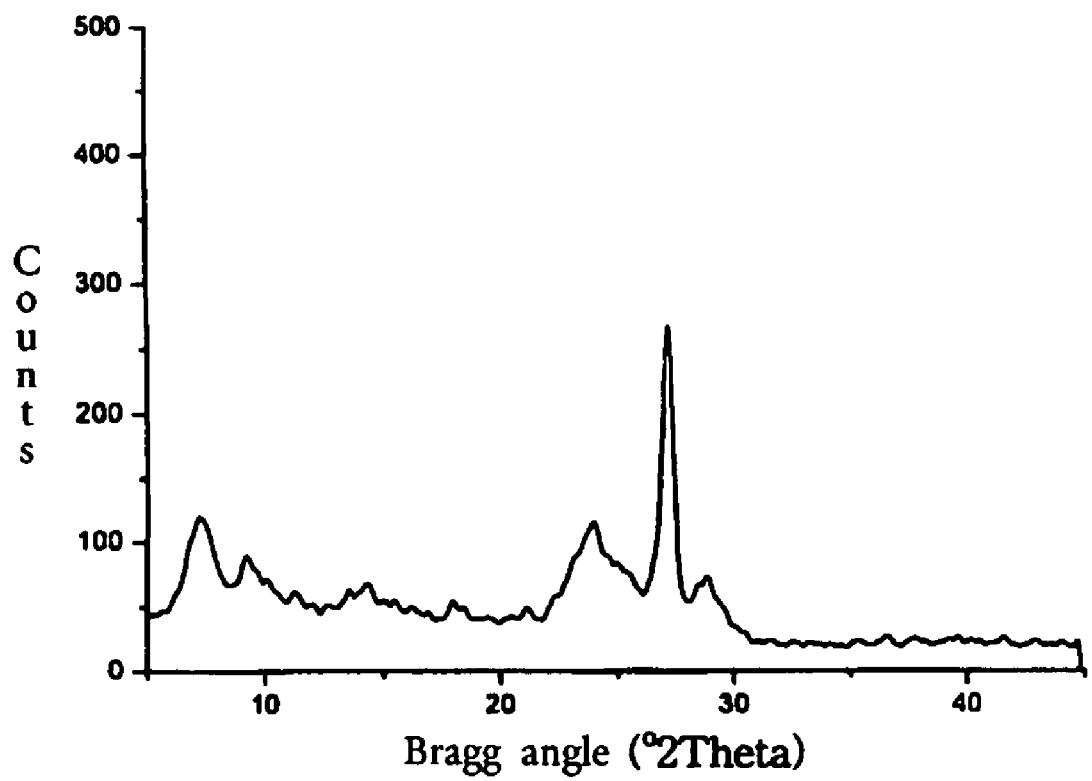
FIG. 9 is a graph showing the X-ray diffraction pattern of oxytitanium phthalocyanine prepared in Comparative Example 5 of the present invention.

10 g of an oxytitanium phthalocyanine crude was dissolved in 500 g of 96% sulfuric acid while the temperature was maintained at 5° C. or less, and the mixture was then stirred for 2 hours at this temperature. After stirring, the sulfuric acid solution was added to a mixed solution of water (2,000 g) and methanol (2,000 g) while the temperature was maintained at −20° C. or less, and was then stirred for 15 minutes at this temperature. The resulting mixture was filtered, washed with methanol and 1% ammonia water, sequentially, and finally washed with water until the filtrate was neutralized (a pH of at least 7.0). The washed mixture was dried in a drier to yield 9.5 g of oxytitanium phthalocyanine. The X-ray diffraction pattern of the oxytitanium phthalocyanine is shown in FIG. 9.

TEST EXAMPLE 1

2.0 g of the oxytitanium phthalocyanine prepared in Example 1, 1.0 g of polyvinylbutyral, 40 g of tetrahydrofuran, and 110 g of glass beads (diameter: 1 mm) were dispersed in a paint shaker for 5 hours, and then 150 g of tetrahydrofuran was added thereto. The mixture was further dispersed for 10 minutes to prepare a coating solution for a charge generating layer. The coating solution was coated on the surface of an oxide film-coated aluminum drum to a thickness of 0.2 μm, and dried in a drier at 120° C. for 5 minutes.

Separately, 25 g of N,N'-bis(3-methylphenyl)-N,N'-diphenylbenzidine (Formula 2) and 25 g of poly(4,4-cyclohexylidene diphenylene carbonate) (Formula 3) were dissolved in 200 g of monochlorobenzene to prepare a coating solution for a charge transport layer.

Formula 2

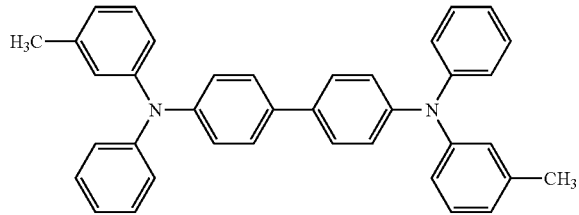

Formula 3

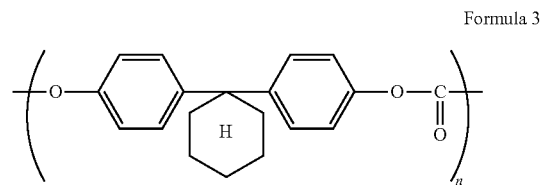

The coating solution for a charge-transport layer was coated on the charge generating layer-coated aluminum drum, and dried in a drier at 120° C. for 30 minutes to form a 20 μm thick charge transport layer, thereby producing a photoconductor drum.

The electrophotographic characteristics of the photoconductor drum were determined using an analyzer PDP-2000 (Quality Engineering Associates Inc., USA) in accordance with the following procedures.

1) Initial Surface Potential (VDDP)

When the photoconductor drum was charged by corona discharge at −60 kV, a potential generated on the surface of the photoconductor drum was measured.

2) Dark Decay (DD5)

3 seconds after the surface of the photoconductor drum was charged with a voltage of −700V, change in the potential of the drum surface was measured. The dark decay (DD5) was expressed in percent relative to the initial surface potential $DD5(\%) = $(surface potential 3 seconds after charging/ initial surface potential)×100

3) Sensitivity (E50%)

After the surface of the photoconductor drum was charged with a voltage of −700V and was then exposed to monochromatic light of a wavelength of 750 nm, the intensity of the monochromatic light required to reduce the surface potential of the drum to half of the initial surface potential of the drum was determined.

4) Final Potential (VF)

After the surface of the drum was charged with a voltage of −700V and was exposed to monochromatic light of a wavelength of 780 nm and an intensity of 13 J/cm², the surface potential was measured.

The obtained results are summarized in Table 1.

TEST EXAMPLES 2 AND 3

The procedures of Test Example 1 were repeated, except that the oxytitanium phthalocyanine charge generating materials prepared in Examples 2 and 3 were used. The results are summarized in Table 1.

TEST EXAMPLES 4 TO 8

The procedures of Test Example 1 were repeated, except that the oxytitanium phthalocyanine charge generating materials prepared in Comparative Examples 1 to 5 were used. The results are summarized in Table 1.

TABLE 1

Measurement results of electrophotographic characteristics

| Test Example No. | Charge generating material | VDDP (V) | DD5 (%) | E50% (J/cm²) | VF (V) |
|---|---|---|---|---|---|
| 1 | Example 1 | −666 | 92.0 | 0.101 | −64 |
| 2 | Example 2 | −682 | 90.2 | 0.108 | −49 |
| 3 | Example 3 | −674 | 90.6 | 0.111 | −54 |
| 4 | Comparative Example 1* | −502 | 70.1 | 0.508 | −108 |
| 5 | Comparative Example 2 | −602 | 79.1 | 0.378 | −66 |
| 6 | Comparative Example 3 | −619 | 81.2 | 0.412 | −74 |
| 7 | Comparative Example 4 | −600 | 62.0 | 0.130 | −46 |
| 8 | Comparative Example 5 | −627 | 75.1 | 0.185 | −108 |

*Because the drum surface was not charged to a voltage of −700 V, the voltage of the corona charger was set to 7.45 kV for the measurement of the electrophotographic characteristics.

INDUSTRIAL APPLICABILITY

As apparent from the above description, according to the method of the present invention, since the combination of sulfuric acid and the wet grinder can markedly lower the concentration and amount of the sulfuric acid used, costs required for neutralization of waste sulfuric acid can be greatly reduced. In addition, oxytitanium phthalocyanine usable as a high-quality charge generating material can be prepared without the use of expensive and difficult-to-handle reactants, such as trifluoroacetic acid and pentafluoropropionic acid.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for preparing an oxytitanium phthalocyanine as a charge generating material, comprising the steps of:
    mixing 30-100 wt % sulfuric acid and an oxytitanium phthalocyanine crude in a mixing ratio between 100:1 and 1:1;
    homogeneously grinding the mixture in a wet grinder containing at least one grinding media selected from the group consisting of a zirconia and glass beads at −20° C.-60° C. for 0.1-24 hours to form a ground mixture comprising an oxytitanium phthalocyanine component, the grinding media and the sulfuric acid;
    adding a solvent to the ground mixture to form a diluted mixture; separating the grinding media from the diluted mixture to obtain an oxytitanium phthalocyanine mixture comprising the oxytitanium phthalocyanine and the solvent; and
    isolating the oxytitanium phthalocyanine.

2. The method according to claim 1, wherein the oxytitanium phthalocyanine is obtained by reacting 1,2-dicyanobenzene or 1,3-diiminoisoindoline as a main material with titanium tetrachloride or tetraalkoxy titanium as a titanium source in N-methylpyrrolidone, 1-chloronaphthalene or quinoline as a solvent at 160~200° C. for 6~12 hours, and purifying the obtained reaction product.

3. The method according to claim 1, wherein the sulfuric acid has a concentration of 50~80 wt %.

4. The method according to claim 1, wherein the mixing and grinding is carried out at a temperature of 0° C.~25° C.

5. The method according to claim 1, wherein the mixing and grinding is carried out for 3~5 hours.

6. The method according to claim 1, wherein the wet grinder is an agitation-type wet grinder selected from attritors, sand mills and pearl mills; a diffuser selected from red devils; a ball mill; or vibration mill.

7. The method according to claim 1, wherein the grinding media are removed by adding the solvent to the ground mixture in a ratio of 1:4 to form a slurry, filtering the slurry, washing with the solvent, and drying at 40~80° C. for 3~20 hours.

8. The method according to claim 1, wherein the solvent is selected from water; aliphatic alcohols, including methanol and ethanol; ketones, including acetone, methyl ethyl ketone and tetrahydrofuran; and mixtures thereof.

9. An oxytitanium phthalocyanine charge generating material prepared by the method according to claim 1 wherein the charge generating material shows X-ray diffraction peaks at Bragg angles of 7.5±0.2°, 11.4±0.2°, 13.7±0.2°, 14.8±0.2°, 18.0±0.2°, 18.8±0.2°, 23.0±0.2°, 25.1±0.2°, 27.2±0.2° and 28.8±0.2°.

10. The oxytitanium phthalocyanine charge generating material according to claim 9, wherein the charge generating material shows the strongest X-ray diffraction peak at a Bragg angle of 27.2±0.2°.

11. A photoconductor produced using the oxytitanium phthalocyanine charge generating material according to claim 9.

12. The method according to claim 1, further comprising:
filtering the oxytitanium phthalocyanine mixture to isolate the oxytitanium phthalocyanine; and
washing the oxytitanium phthalocyanine.

13. The method of claim 12, wherein the washing is carried out until the oxytitanium phthalocyanine is neutralized; and
wherein the method further comprises drying the neutralized oxytitanium phthalocyanine.

14. The method of claim 13, further comprising:
mixing the dried oxytitanium phthalocyanine with polyvinylbutyral to form a coating solution for a charge generating layer; and
coating a drum with the coating solution for a charge generating layer.

* * * * *